US010740265B1

(12) United States Patent
Xu et al.

(10) Patent No.: US 10,740,265 B1
(45) Date of Patent: Aug. 11, 2020

(54) PCI-BASED BUS SYSTEM HAVING PERIPHERAL DEVICE ADDRESS TRANSLATION BASED ON BASE ADDRESS REGISTER (BAR) INDEX

(71) Applicant: Amazon Technologies, Inc., Seattle, WA (US)

(72) Inventors: Kun Xu, Austin, TX (US); Ron Diamant, Albany, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/144,910

(22) Filed: Sep. 27, 2018

(51) Int. Cl.
 G06F 13/00 (2006.01)
 G06F 13/16 (2006.01)
 G06F 13/42 (2006.01)
(52) U.S. Cl.
 CPC ...... *G06F 13/1694* (2013.01); *G06F 13/4221* (2013.01); *G06F 2213/0024* (2013.01)
(58) Field of Classification Search
 CPC .................................................. G06G 13/1694
 See application file for complete search history.

(56) References Cited

U.S. PATENT DOCUMENTS 6,128,718 A * 10/2000 Schmisseur ............. G06F 9/342
  711/211
6,662,242 B2 * 12/2003 Holm ................... G06F 12/0684
  710/10
9,021,141 B2 * 4/2015 El-Batal ................ G06F 13/385
  710/1

OTHER PUBLICATIONS

Wikipedia, PCI configuration space, https://en.wikipedia.org/wiki/PCI_configuration_space, Aug. 28, 2018, 5 pages.

* cited by examiner

*Primary Examiner* — Tammara R Peyton
(74) *Attorney, Agent, or Firm* — Kilpatrick Townsend & Stockton LLP

(57) ABSTRACT

Methods and apparatus for performing memory access are provided. In one example, an apparatus comprises a hardware processor, a memory, and a bus interface. The hardware processor is configured to: receive, from a host device and via the bus interface, a packet including a host input address, the host input address being defined based on a first host address space operated by the host device; determine, based on the host input address, a host relative address, the host relative address being relative to a first host base address of the first host address space; determine, based on the host relative address, a target device address of the memory; and access the memory at the target device address on behalf of the host device.

24 Claims, 11 Drawing Sheets

US 10,740,265 B1

PCI-BASED BUS SYSTEM HAVING PERIPHERAL DEVICE ADDRESS TRANSLATION BASED ON BASE ADDRESS REGISTER (BAR) INDEX

BACKGROUND

Compute systems may include peripheral devices, such as network devices, that add to the functionality of the computing system. In many cases, the peripheral devices are connected to the computing system using an interconnect. The interconnect may implement a standard bus protocol, such as any of the Peripheral Component Interconnect (PCI) family of bus protocols. To communicate with the peripheral device, a host processor of the computing system may transmit packets via the bus to the peripheral device. The packets may be configured to perform access operations (e.g., read and write operations) at the local memory device of the peripheral device to control an operation at the peripheral device. The packets may include host addresses in a host address space in which the host processor operates. The host addresses may be translated into device addresses in a device address space in which the peripheral device operates, to perform the access operations at the local memory device.

BRIEF DESCRIPTION OF THE DRAWINGS

Various embodiments in accordance with the present disclosure will be described with reference to the drawings, in which.

DETAILED DESCRIPTION

Figure 1:
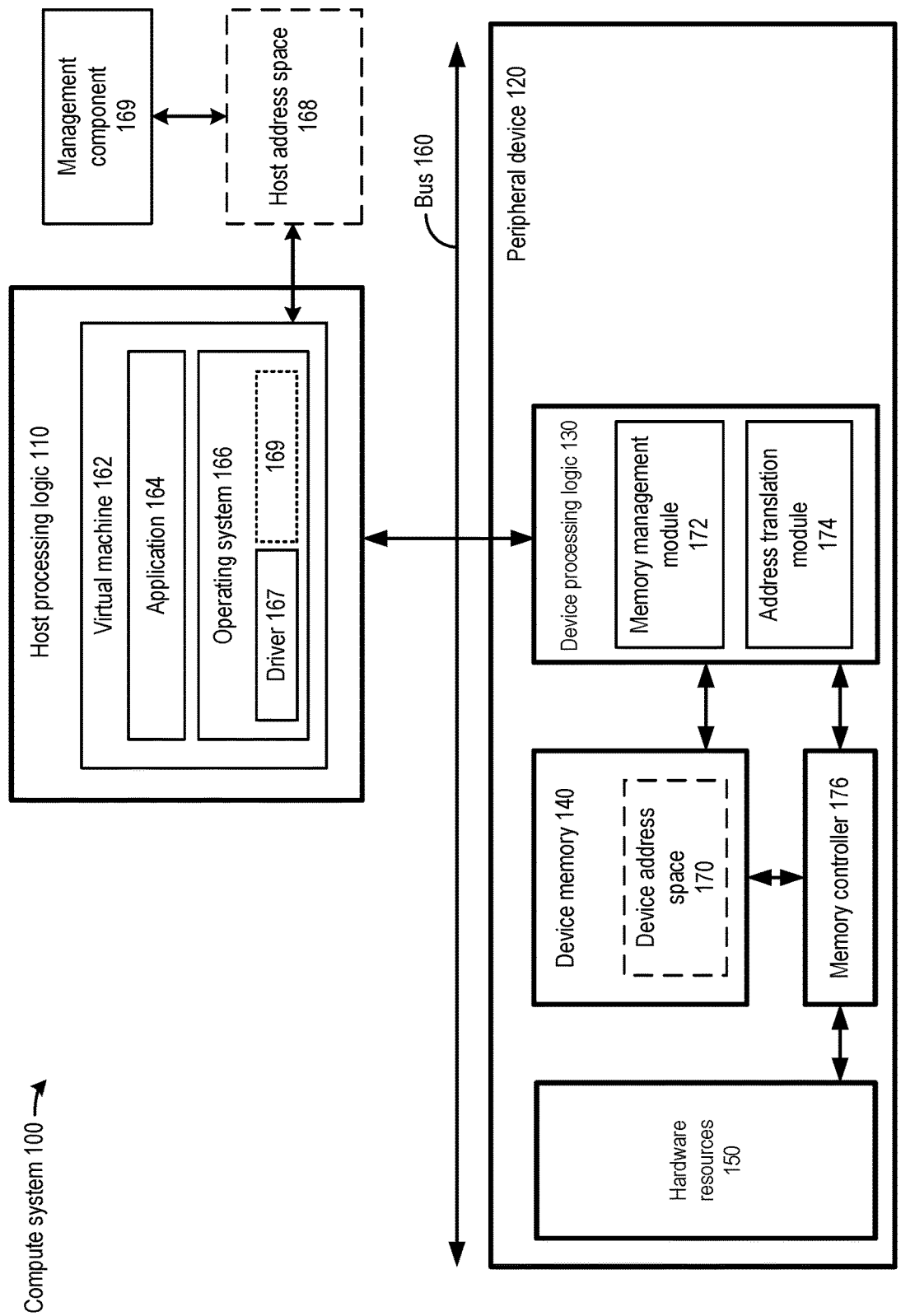
FIG. 1 illustrates a block diagram of a compute system in which the disclosed techniques can be implemented.

In a computing system, a host processor may be connected to a peripheral device (or multiple peripheral devices) via an interconnect. The host processor may access the local memory resources of the peripheral device to control an operation of the peripheral device. The peripheral device memory resources are typically allocated by the firmware or state machines of the peripheral device, instead of by the host processor, since the firmware is usually in the best position to understand what memory resources are available, and what memory resources the host processor is not allowed to access. Once the peripheral device allocates the memory resources, the driver/software on the host processor can utilize the memory resources.

To facilitate the access of the peripheral device memory resources by the host processor, an address translation scheme can be provided by the driver/software of the peripheral device. The address translation scheme enables the host processor to operate in a host address space, whereas the peripheral device can operate in a device address space while managing the local memory resources. The host address space typically comprises a continuous address space having multiple contiguous host address regions to simplify management of the host address space at the host processor. On the other hand, the device address space typically comprises a discontinuous address space having multiple non-contiguous device address regions separated by address regions that are inaccessible/unavailable to the host processor. The address translation scheme can map the contiguous host address regions to the non-contiguous device address regions. The driver/software on the host processor can refer to a host input address in the host address space for an access operation to the local memory resources of the peripheral device. The address translation scheme can translate the host input address to a target device address in the device address space. The peripheral device can then perform the access operation to the local memory resources at the target device address.

Example techniques to map contiguous host address regions to non-contiguous device address regions are disclosed. As a first example, a PCI-compatible peripheral device may include a plurality of Base Address Registers (BAR). Each BAR register can store a host base address of a host address region. The peripheral device can store a mapping table that maps each BAR register to a device address region, and multiple BAR registers can be mapped to multiple device address regions. Although such arrangements allow mapping to non-contiguous device address regions, the number of non-contiguous device address regions that can be mapped is limited by the number of BAR registers. For example, in a case where 32-bit addressing mode is used, a total of six BAR registers can be used for the mapping, whereas in a case where 64-bit addressing mode is used, a total of three BAR registers can be used for the mapping. The number of BAR registers limits the total number of non-contiguous device address regions to be no more than six for 32-bit addressing mode, and no more than three for 64-bit addressing mode. Such arrangements may not work if the device address space is highly fragmented and includes a large number of discontinuous device address regions.

As another example, the host processor may also provide the host addresses of the host address regions to the driver/software of the peripheral device, which can map the host addresses to the device addresses of the device address regions. The host addresses can be within a host address space associated with a host base address, such that a BAR register (that stores the host base address) can be mapped to multiple device address regions. Such arrangements, however, may be undesirable as they may compromise the security of the host processor by exposing the host addresses to malicious users. For example, the peripheral device may store a plurality of host addresses in a non-secure memory device, which a malicious user may gain access to and obtain the host addresses. The host addresses may be part of a host address space mapped to other memory devices that store sensitive information. Based on the host addresses, the malicious user may be able to gain access to those memory devices and access the sensitive information. On the other hand, without knowing about those host addresses, the peripheral device cannot map those host addresses to the device address regions.

This disclosure proposes techniques that can facilitate the access of the peripheral device memory resources by the host processor while addressing at least some of the aforementioned shortcomings. In one example, a system comprising a host processor and a peripheral device is provided. The peripheral device includes a device memory and is coupled with the host processor via a bus. The host processor may operate in a host address space that starts with a host base address and comprises a plurality of host address regions, with each host address region having a host starting address. The peripheral device may operate in a device address space comprising a plurality of device address regions, with each device address region having a device starting address. The peripheral device may maintain a mapping table that maps each device starting address of each device address region to a host relative address of a host address region. Each host relative address of a host address region represents an offset or a distance between the host base address and the host starting address of the host address region. The mapping table can be associated with a BAR register that stores the host base address.

The peripheral device may access the device memory for the host processor using the mapping table. For example, the peripheral device may receive a request to access the device memory from the host processor. The request may include a host input address defined in the host address space. The peripheral device may first identify the mapping table based on determining that the host input address is in the host address space associated with the host base address. The peripheral device may also compute an offset between the host input address and the host base address, and select a host relative address in the mapping table based on the offset. The peripheral device may identify the device base address mapped to the selected host relative address, and determine a target device address by adding the offset to the device base address. The peripheral device can then access the device memory at the target device address for the request.

With the disclosed techniques, the peripheral device can map multiple device address regions to a host base address (and a BAR register), such that the number of device address regions mapped to the host address space is not limited by the number of BAR registers. The disclosed techniques can also improve security. For example, the software/driver of the peripheral device can map the device base addresses to the host relative addresses which are merely offsets from the host base address provided by the host processor. The software/driver of the peripheral device needs not have access to the different host addresses in the host address space, which reduces the security risk posed by exposing the host addresses.

In addition, the disclosed techniques can also reduce the memory management burden on both the host processor and the peripheral device by decoupling the memory management operations between the peripheral device and the host processor, which can reduce the burden of memory management on both devices. For example, the peripheral device can perform memory allocation at the device memory and determine a plurality of device address regions accessible by the host processor, and map the device base addresses of the plurality of device address regions to the host relative addresses. The peripheral device can determine the host relative addresses based on the sizes of each device address region and based on an assumption that the device address regions are to be mapped to contiguous host address regions within a host address space. Meanwhile, the host processor can allocate the host address space and determine the host base address, and provide the host base address to the peripheral device to perform the address translation using the mapping table. The host processor needs not determine the host relative addresses in the mapping table, and any changes in the mapping table can be transparent to the host processor. As to be described in more details below, such arrangements enable the host processor and the peripheral device to independently manage, respectively, the host address space and the device address space, which can facilitate interoperation between the host processor and the peripheral device and can improve the performance of the compute system a whole.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates a block diagram of a compute system 100. As shown in FIG. 1, compute system 100 includes host processing logic 110 and a peripheral device 120. Peripheral device 120 may comprise device processing logic 130, a device memory 140, and hardware resources 150. Host processing logic 110 may be electrically coupled with device processing logic 130 via a bus 160. Although FIG. 1 includes blocks to represent particular hardware, the electrical connections illustrated in FIG. 1 are not necessarily complete as FIG. 1 is presented to show the flow of a process that includes the illustrated hardware components.

Host processing logic 110 and device processing logic 130 may include one or more processors, microprocessors, field-programmable gate arrays (FPGAs) or other suitable processing logic. The processors may be general purpose computing devices such as are manufactured by Intel®, AMD® ARM®, Qualcomm®, and others. The processors are generally capable of executing software code. A processor may include multiple processing cores. In addition, device memory 140 may provide temporary or long-term storage for data that may be accessed by host processing logics 110 and 130. Device memory 140 may include Dynamic Random Access Memory (DRAM), Synchronous DRAM (SDRAM), and/or Double Data Rate (DDR), among others. In some cases, device memory 140 may also include Read-Only Memory (ROM), such as Programmable Read-Only Memory (PROM), Erasable Programmable Read-Only Memory (EPROM), Electrically Erasable Programmable Read-Only Memory (EEPROM), and/or Flash EEPROM, among others.

Bus 160 in FIG. 1 may be any suitable bus to support communication between host processing logic 110 and peripheral device 120. For example, bus 160 may be used for writing data from host processing logic 110 to device memory 140, as will be described in more detail below. Bus 160 may implement one or more variations of the Peripheral Component Interconnect (PCI) standard bus protocols, in some embodiments. A bus is a communication channel that transfers data within a computing system, or between a computing system and other devices. A standard bus protocol is a data transfer protocol for which a specification has been defined and adopted by various manufacturers. Manufacturers ensure that compliant devices are compatible with computing systems implementing the bus protocol, and vice versa. PCI describes a family of related, standardized bus protocols. PCI includes the original PCI standard, PCI-eXtended (PCI-X), Accelerated Graphics Port (AGP), and PCI Express (PCIe, also referred to as PCI-XP). The term "PCI" or "PCI-based" may be used herein to describe any protocol in the PCI family of bus protocols. Other bus protocols can be used for bus 160, such as for example, Industry Standard Architecture (ISA), Extended ISA (EISA), Video Electronics Standards Association (VESA), Micro Channel, and any of the Advanced Technology Attachment (ATA) family of protocols, among others. The illustrated example can also be implemented with a combination of standard bus protocols, a combination of proprietary bus protocols, and/or a combination of standard and proprietary bus protocols.

In addition, as shown in FIG. 1, one or more virtual machines (VMs) may running on host processing logic 110. Specifically, a virtual machine 162 is configured to run on host processing logic 110 and may include an user application 164 and a guest operating system 166 including a driver 167. In one example, 64 VMs run on host processing logic 110, which may have multiple processing cores. "Bare-metal" environments where host processing logic 110 does not run VMs are also possible, in some examples. Although FIG. 1 shows that virtual machine 162 includes driver 167, it is understood that in other examples virtual machine 162 may utilize a driver of management component 169 (e.g., a hypervisor) configured to manage one or more virtual machines on host processing logic 110.

Each of the virtual machines may execute a respective guest operating system 166 on host processing logic 110. A user can log into virtual machine 162 and interact with application 164. In some cases, application 164 can communicate with peripheral device 120 using driver 167 to use hardware resources 150 to perform certain operations. For example, application 164 can include a classifier application to perform an image recognition operation, and hardware resources 150 can include a neural network processor to perform neural network computations to support the image recognition operation.

Virtual machine 162 (and application 164 and driver 167) may operate in a host address space 168. Host address space 168 can be managed by a management component 169. As shown in FIG. 1, management component 169 can be part of guest operating system 166 of virtual machine 162. Management component 169 can also be external to virtual machine 162 and be part of compute system 100 (e.g., a hypervisor), etc. Host address space 168 may include a plurality of host address regions, each comprising a range of consecutive virtual addresses. Each host address region can be mapped to a device address region of a device address space 170. Device address space 170 may include physical addresses of device memory 140, which can be managed by a memory management module 172 of device processing logic 130. The mapping of host address space 168 to device address space 170 can also be managed by memory management module 172 and may be used to support inbound communication from application 164 to peripheral device 120. For example, application 164 can perform a memory write operation to store data at a host input address within host address space 168. Device processing logic 130 can include an address translation module 174 to translate the host input address into a device address within device address space 170, and a memory controller can perform a memory write operation to store the data at device memory 140 at the device address. Such arrangements allows application 164 (and host processing logic 110) to operate in a virtual address space in accessing device memory 140 and to relieve host processing logic 110 from the burden of managing the physical address spaces of device memory 140. Both memory management module 172 and address translation module 174 can be a firmware being executed on device processing logic 130, or can be part of hardware logic circuits of device processing logic 130.

The inbound communication can be part of an operation of hardware resources 150 controlled by application 164. As an illustrative example, application 164 may write image data targeted at hardware resources 150 at a host input address within host address space 168. The write operation may trigger driver 167 to send a packet including the host input address and the image data to device processing logic 130 via bus 160. Upon receiving the packet, address translation module 174 can translate the host input address to a target device address of device address space 170, and provide the host input address and the data to memory controller 176. Upon obtaining the target device address and the data, memory controller 176 can perform the write operation to store the data in device memory 140 at the target device address. After the image data is stored, hardware resources 150 can obtain the image data from device memory 140 via memory controller 176 to perform, for example, neural network computations to support the image recognition operation of application 164.

Figure 2:
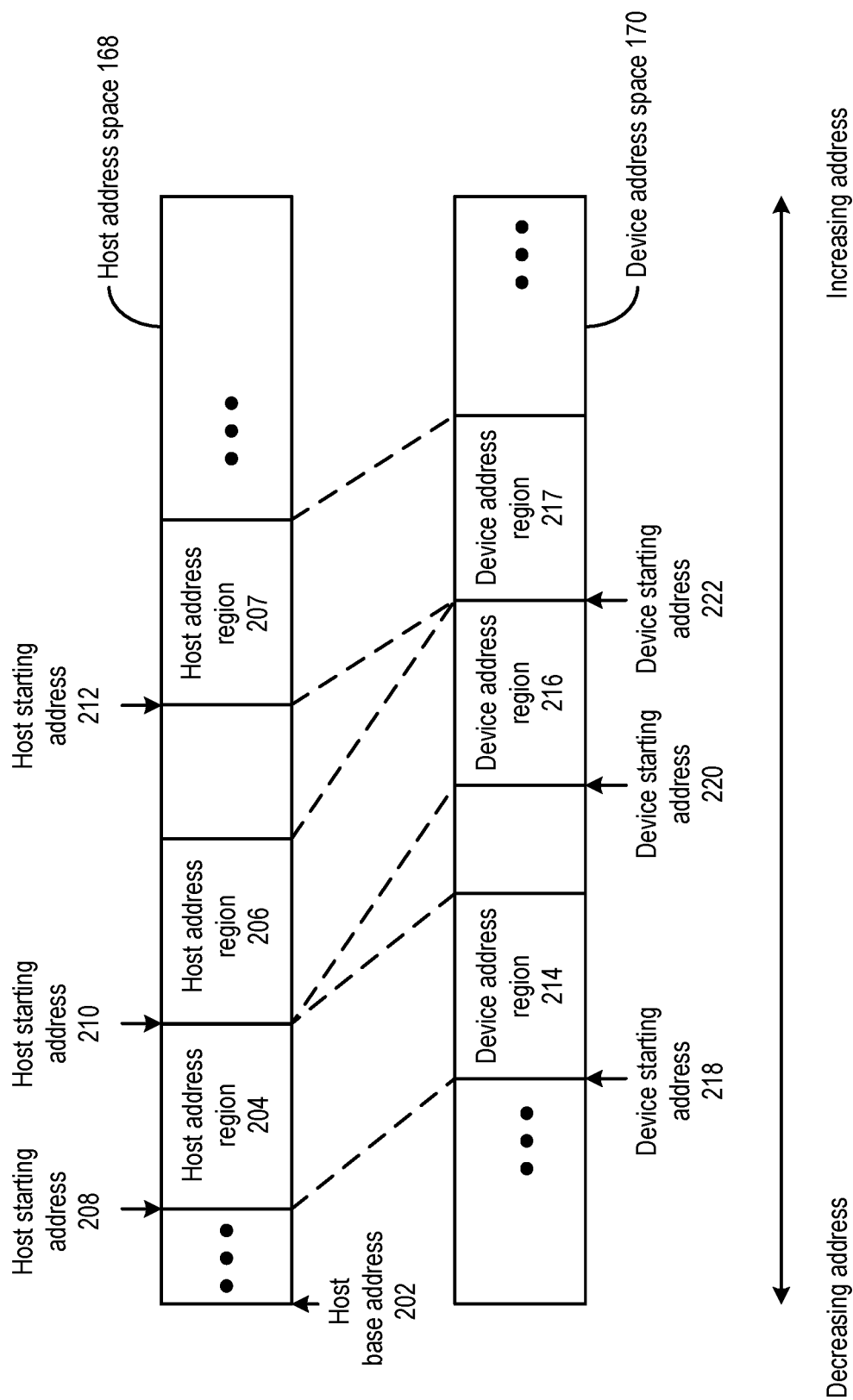
FIG. 2 illustrates an example of mapping between a host address space and a device address space operated by different components of the compute system of FIG. 1.

FIG. 2 illustrates an example of mapping between host address space 168 and device address space 170. As described above, host address space 168 may be allocated and managed by management component 169 which can be part of guest operating system 166 of virtual machine 162, a hypervisor of compute system 100, etc. Host address space 168 may include a range of virtual addresses which starts at host base address 202. Host address space 168 may include multiple host address regions including, for example, a host address region 204, a host address region 206, and a host address region 207. Each host address region includes a subrange of consecutive virtual addresses. The subrange of virtual addresses of host address region 204 starts at host starting address 208, the subrange of virtual addresses of host address region 206 starts at host starting address 210, whereas the subrange of virtual address of host address region 207 starts at host starting address 212. Some of the host address regions can be contiguous while some are not. For example, as shown in FIG. 2, the host address regions 204 and 206 are contiguous, whereas host address regions 206 and 207 are not contiguous. The determination of host address regions and their relative locations can be based on various criteria, such as application requirement, security requirement, etc. For example, management component 169 may allocate contiguous host address regions 204 and 206 as a single host address region to one application (e.g., application 164), and allocate host address region 207 to another application, due to their different needs for memory resources. Management component 169 may also separate out host address region 206 from host address region 207 by making them non-contiguous to, for example, prevent application 164 from accessing the host address region allocated to the another application.

In addition, device address space 170 may include a range of physical addresses of device memory 140 allocated and managed by memory management module 172 of device processing logic 130. Device address space 170 may include multiple device address regions including, for example, a device address region 214, a device address region 216, and a device address region 217. Each device address region also includes a subrange of consecutive physical addresses. The subrange of physical addresses of device address region 214 starts with device starting address 218, the subrange of physical addresses of device address region 216 starts with device starting address 220, whereas the subrange of physical addresses of device address region 217 starts with device starting address 222. Device address regions 214, 216, and 217 can be determined based on, for example, availability of device memory 140 to host processing logic 110. Some of the host address regions can be contiguous while some are not. For example, device address regions 214 and 216 are not contiguous and are separated by a device address region that is inaccessible (or unavailable) to host processing logic 110. But device address region 216 is contiguous to device address region 217.

As shown in FIG. 2, host address regions 204, 206, and 207 can be mapped to, respectively, device address regions 214, 216, and 217 to support communication between host processing logic 110 and peripheral device 120. The mapping can be performed based on an address translation operation performed by address translation module 174. As described above, when application 164 performs an access operation at a host address (e.g., a host address within host address region 204), the host address can be translated to a target device address (e.g., a device address within device address region 214) based on the mapping, and the target address can be provided to memory controller 176. Memory controller 176 can then perform the access operation at device memory 140 at the target device address.

Figure 3A:
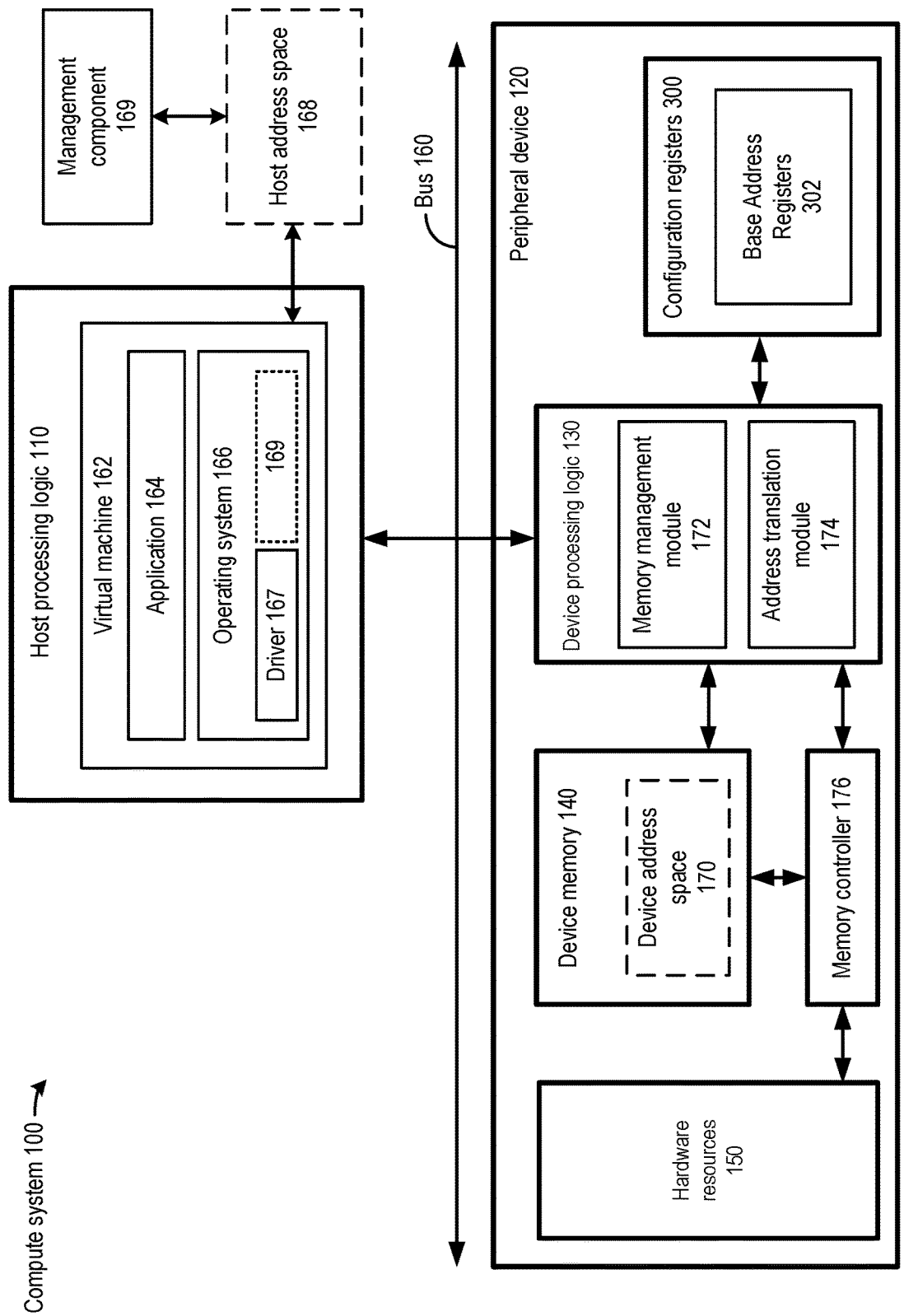
FIG. 3A, FIG. 3B, and FIG. 3C illustrate examples of components and address translation operations in the compute system of FIG. 1 according to certain aspects of the present disclosure.
Figure 3B:
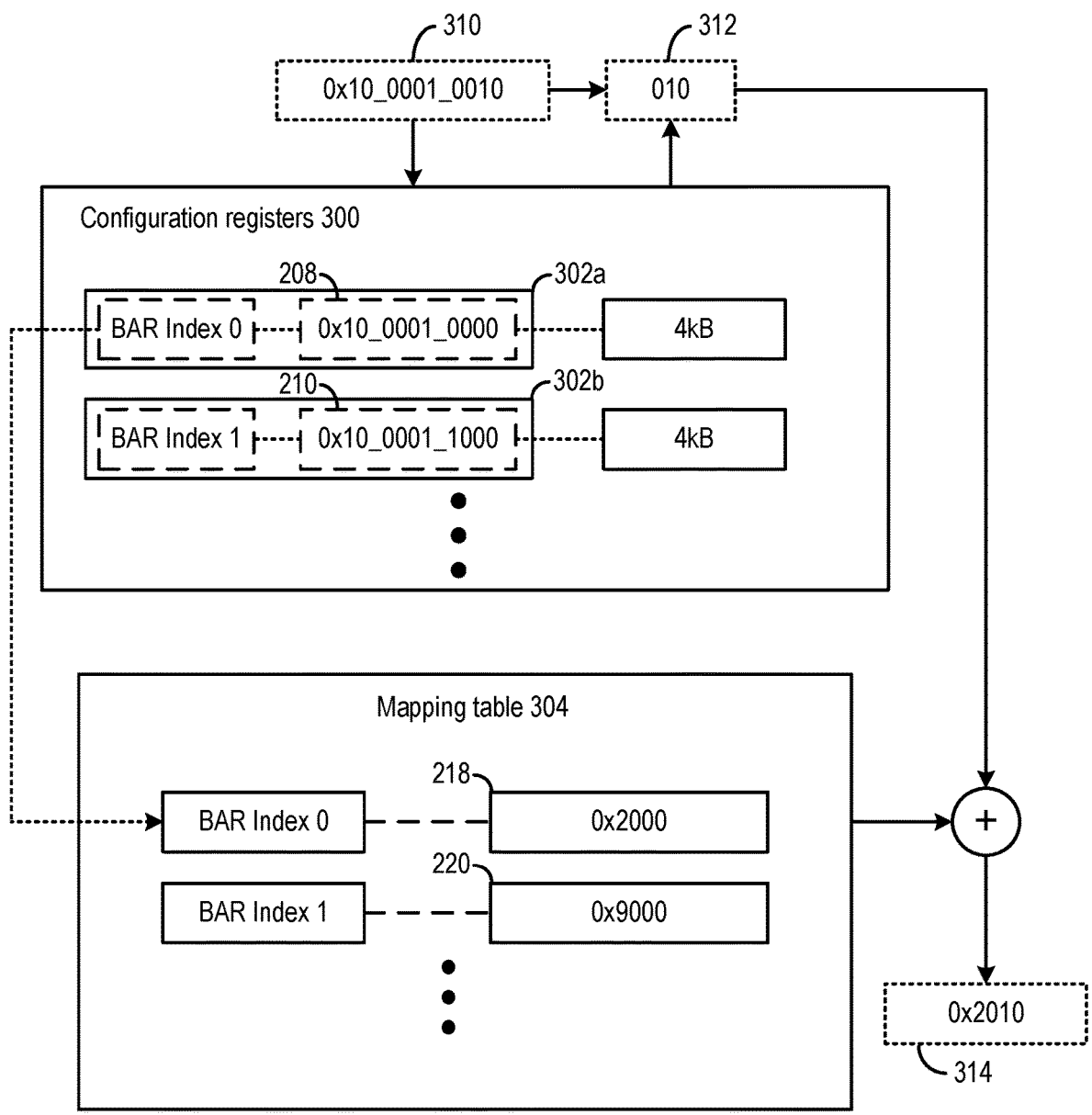
Figure 3C:
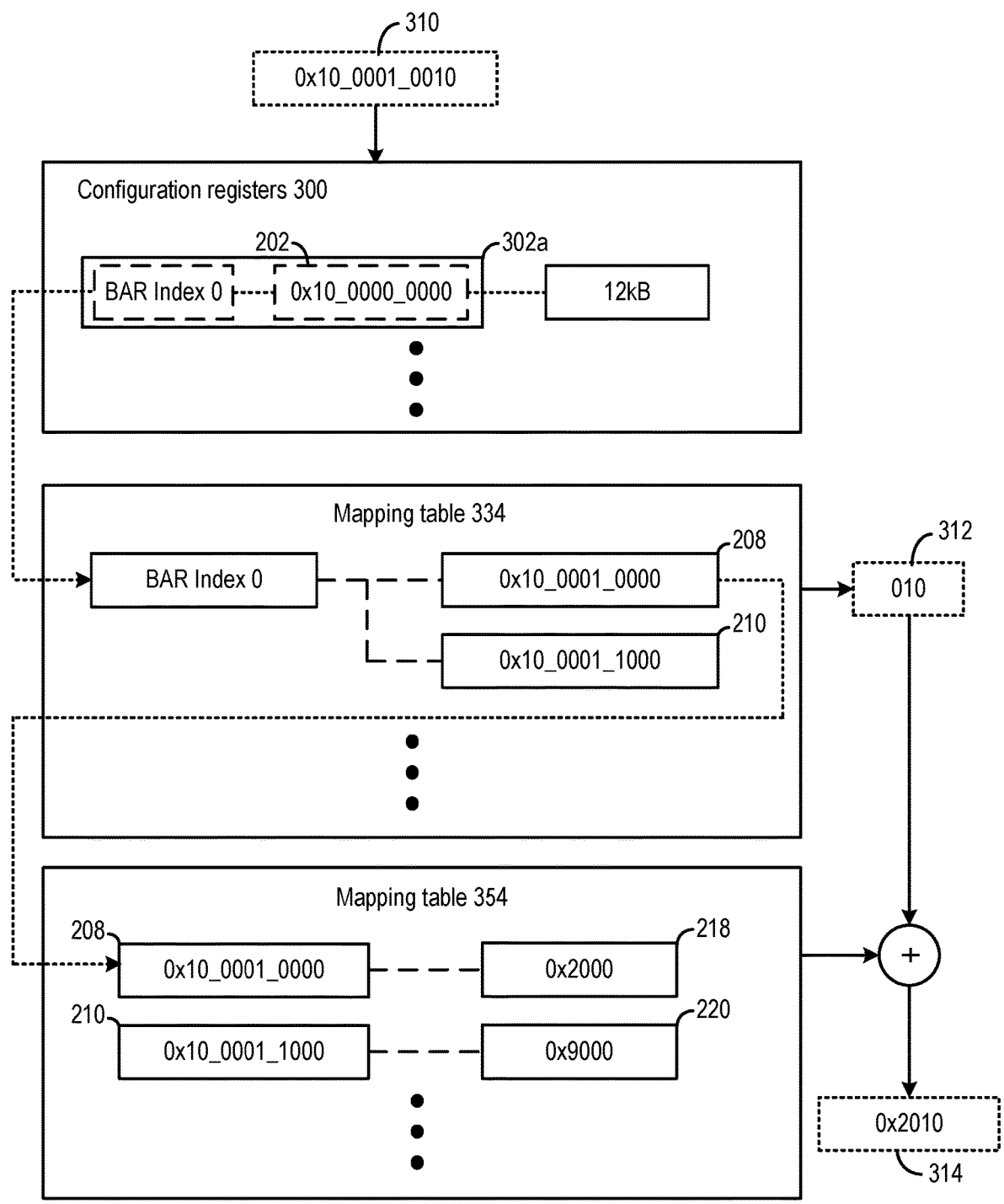

FIG. 3A, FIG. 3B, and FIG. 3C illustrate examples of components to support address translation operations in compute system 100 of FIG. 1. As shown in FIG. 3A, peripheral device 120 may be a PCI-compatible device and may include a plurality of configuration registers 300 including Base Address Registers (BAR) 302. BAR registers 302 can be used in a PCI-e enumeration process for host processing logic 110 to discover peripheral device 120, and to determine the host address space 168 to be allocated to be mapped to device address space 170 of device memory 140. For example, memory management module 172 of device processing logic 130 may store, at a BAR register, a value representing a total size of device address space 170 made available to host processing logic 110. Based on the total size value, guest operating system 166 (or management component 169) can allocate host address space 168 having the same total size as device address space 170, and store the host base address 202 of host address space at the BAR register. In some examples, device processing logic 130 may also store, at different BAR registers, the sizes of individual device address regions 214 and 216. Host processing logic 110 can read the sizes values from the BAR registers, allocate host address regions 204 and 206, and store the starting base address for each regions (e.g., host starting addresses 208 and 210) at BAR registers 302. Each of the BAR register may be associated with a BAR index, which can be used by device processing logic 130 as an alias to a host base address stored in the BAR register. The BAR registers are typically encapsulated in a secure region that is only accessible by, for example, guest operating system 166, management component 169, the firmware of device processing logic 130, etc., and are typically not accessible by the user.

Memory management module 172 of device processing logic 130 can determine a mapping between the host address space 168 and device address space 170 based on how the BAR registers are programmed, and the mapping information can be provided to address translation module 174 to perform the address translation. FIG. 3B illustrates an example of mapping and address translation operations. As shown in FIG. 3B, BAR registers 302a and 302b of configuration registers 300, associated with BAR index 0 and BAR index 1 respectively, store the host starting addresses for two host address regions. BAR register 302a may store the host starting address 208 of host address region 204 (having a hex value of 0x10000000 in FIG. 3B), whereas BAR register 302b may store the host starting address 210 of host address region 206 (having a hex value 0x1000001000 in FIG. 3B). Configuration registers 300 further include BAR register 302a to store a BAR size associated with a BAR register. The BAR size can represent the size of a host address region of which the host starting address (or the host base address) is stored in the corresponding BAR register. In the example of FIG. 3B, each of host address region 204 and host address region 206 has a size of 4 kilobytes (kB). The values stored at BAR register 302a and 302b can be provided by host processing logic 110 as a result of the PCI-e enumeration process, as described above.

In addition, memory management module 172 of device processing logic 130 can maintain a mapping table 304 that maps each BAR index (or the host starting address stored in the corresponding BAR register) to a device starting address of a device address region. For example, BAR index 0 (of BAR register 302a which stores the host starting address 208 of host address region 204) is mapped to device starting address 218 of device address region 214 (having a hex value 0x2000 in FIG. 3B), as indicated by the dotted line arrow in FIG. 3B. Further, BAR index 1 (of BAR register 302b which stores the host starting address 210 of host address region 206) is mapped to device starting address 220 of device address region 216 (having a hex value 0x9000 in FIG. 3B). Mapping table 304 can be stored in, for example, device memory 140 and/or in another local memory device of peripheral device 120.

Address translation module 174 can use the content of BAR registers 302a and 302b, as well as mapping table 304, to perform translation of a host input address 310 (of a hex value of 0x100010010 in FIG. 3B) into a target device address 314. Specifically, based on the host starting addresses stored in each BAR register and the BAR size, address translation module 174 can determine the address ranges for each host address region, and determine which of the address ranges includes the host input address 310. In the example of FIG. 3B, address translation module 174 may determine that host input address 310 is within the address range starting from the host starting address 208 (having a hex value of 0x100010010 in FIG. 3B) which is stored in BAR register 302a having the BAR index 0. After determining the host starting address of the host address region that includes host input address 310, address translation module 174 can determine an offset 312 (having a hex value of 0x010 in FIG. 3B) between host input address 310 host starting address 208. Address translation module 174 can also select BAR index 0 based on determining that host input address 310 is within the address range starting from the host starting address 208, and select device starting address 218 (having a hex value of 0x2000 in FIG. 3B) which is mapped to BAR index 0 in mapping table 304. Address translation module 174 can combine device starting address 218 with offset 312 to obtain target device address 314, and access device memory 140 using target device address 314.

In the example of FIG. 3B, host addresses are stored only in configuration registers 300. Such arrangements can improve security, since configuration registers 300 are typically not accessible by the users of compute system 100 (or other users), and are only accessible to, for example, management component 169, memory management module 172 and address translation module 174 of device processing logic 130, etc. Therefore, the risk of exposing the host addresses to malicious users can be reduced. However, as each BAR register is mapped to only one device memory region, the number of device memory regions of device address space 170 mapped to host address space 168 is limited by the number of BAR registers.

FIG. 3C illustrates another example of components to support address translation operations in compute system 100 of FIG. 1. In the example of FIG. 3C, multiple device address regions are mapped to a single BAR index. For example, BAR register 302a of configuration registers 300 stores host base address 202 (having a hex value of 0x100000000 in FIG. 3C). In addition, memory management module 172 of device processing logic 130 can maintain a mapping table 334 and a mapping table 354. Mapping table 334 can map each BAR index (or the host base address stored in the corresponding BAR register) to a plurality of host starting addresses of a plurality of host address regions included in the host address space having the host base address. In the example of FIG. 3C, BAR index 0 is mapped to host starting addresses 208 and 210 of host address regions 204 and 206. Moreover, mapping table 354 can map each host starting addresses listed in mapping table 334 to a device starting address. For example, mapping table 354 maps host starting addresses 208 and 210 to, respectively, device starting address 218 of device address region 214 and device starting address 220 of device address region 216. Mapping tables 334 and 354 can be stored in, for example, device memory 140 and/or in other local memory device of peripheral device 120.

Address translation module 174 can use the content of BAR register 302a, as well as mapping tables 334 and 354, to perform translation of host input address 310 (of a hex value of 0x100010010 in FIG. 3B) into target device address 314. Specifically, based on host base address 202 and the associated BAR size, address translation module 174 can determine that host input address 310 is within the address range of host address space 168, and select BAR index 0 based on the determination, as described in FIG. 3B. Address translation module 174 can refer to mapping table 334 and retrieve host starting addresses 208 and 210 which are mapped to BAR index 0. Address translation module 174 can determine that host input address 310 is between host starting address 208 and 210, and determine that host input address 310 is within host address region 204. Based on this determination, address translation module 174 can select host starting address 208 from mapping table 334 and determine offset 312 (having a hex value of 0x010) based on a difference between host input address 310 and host starting address 208. Address translation module 174 can also refer to mapping table 354 and select device starting address 218 which is mapped to host starting address 208, combine device starting address 218 with offset 312 to obtain target device address 314, and access device memory 140 using target device address 314.

In the example of FIG. 3C, the number of device memory regions of device address space 170 mapped to host address space 168 is not limited by the number of BAR registers, as mapping table 334 can map a large number of host starting addresses (which are then mapped to device starting addresses in mapping table 354) to a single BAR index. However, the arrangements of FIG. 3C may require peripheral device 200 to store a plurality of host addresses in a memory region outside configuration registers 300. The memory region may be non-secure and can expose the host addresses of host address space 168 to malicious users.

Figure 4A:
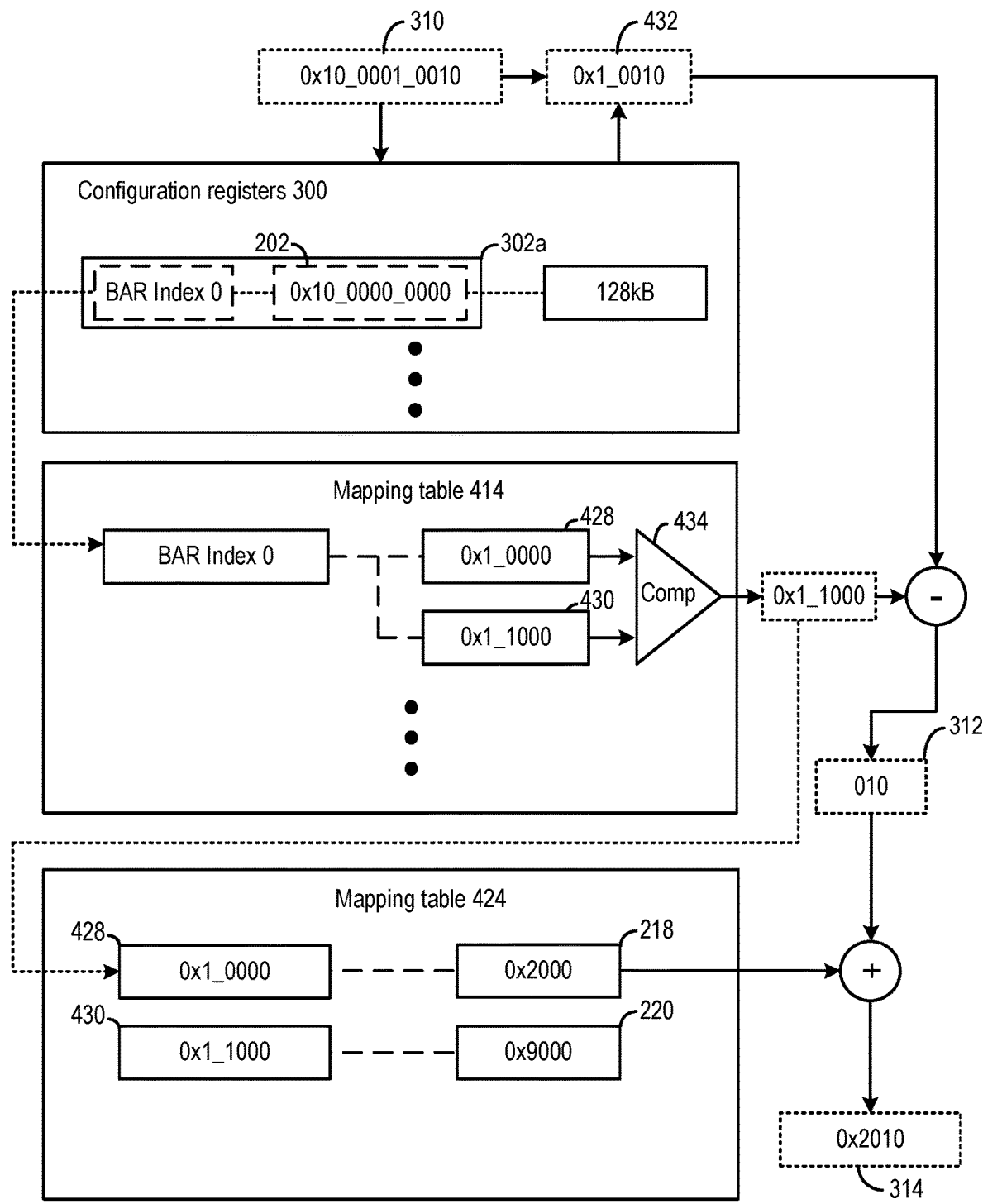
FIG. 4A, FIG. 4B, and FIG. 4C illustrate examples of components and address translation operations in the compute system of FIG. 1 according to certain aspects of the present disclosure.

FIG. 4A illustrates another examples of components to support address translation operations in compute system 100 of FIG. 1. In FIG. 4A, multiple device address regions are also mapped to a single BAR index. Specifically, BAR register 302a of configuration registers 300 stores host base address 202 (having a hex value of 0x100000000 in FIG. 4A). In addition, memory management module 172 of device processing logic 130 can maintain a mapping table 414 and a mapping table 424. Mapping table 414 can map each BAR index (or the host base address stored in the corresponding BAR register) to host relative addresses 428 and 430 of host address regions in a host address space. For example, referring back to FIG. 2, host relative addresses 428 and 430 can represent offsets of, respective, host starting addresses 208 and 210 of host address regions 204 and 206 with respect to host base address 202. Moreover, mapping table 424 can map each host relative addresses listed in mapping table 414 to a device starting address. For example, mapping table 424 maps host relative addresses 428 and 430 to, respectively, device starting address 218 of device address region 214 and device starting address 220 of device address region 216. Mapping tables 414 and 424 can be stored in, for example, device memory 140 and/or in other local memory device of peripheral device 120.

Address translation module 174 can use the content of BAR register 302a, as well as mapping tables 414 and 424, to perform translation of host input address 310 (of a hex value of 0x100010010 in FIG. 4A) into target device address 314. Specifically, based on host base address 202 and the associated BAR size, address translation module 174 can determine the host address range of host address space 168, and select BAR index 0 based on the determination, as described in FIG. 3B and FIG. 3C. In one example, address translation module 174 can refer to the BAR size and extract a pre-determined number of least significant bits (LSB) from host input address 310 based on the BAR size. For example, based on the BAR size of 128 kB, address translation module 174 can extract 20 LSBs and obtain LSB 432 (of a hex value of 0x10010) from host input address 310. Address translation module 174 can include a set of comparators 434 to compare the extracted address with each host relative address in mapping table 414. Based on the result of comparison, address translation module 174 can determine that host input address 310 is within host address region 204 which is represented by host relative address 428 in mapping table 414.

Address translation module 174 can then determine offset 312 (having a hex value of 0x010) based on a difference between host input address 310 and host starting address 208, or based on a difference between LSB 432 and host relative address 428. Address translation module 174 can also refer to mapping table 424 and select device starting address 218 which is mapped to host relative address 428, combine device starting address 218 with offset 312 to obtain target device address 314, and access device memory 140 using target device address 314.

In some examples, memory management module 172 of device processing logic 130 can create or update mapping tables 414 and 424 as part of an PCI-e enumeration process. As part of a memory allocation operation, memory management module 172 can allocate a plurality of device address regions of device address space 170 in device memory 140. Memory management module 172 can also determine the device starting address and a size of each of the set of device address regions. Moreover, as part of the PCI-e enumeration process, memory management module 172 can also store a value representing a total size of the set of device address regions at a BAR register (e.g., BAR register 302a), which enables host processing logic 110 to discover peripheral device 120, and to determine the host address space 168 to be allocated to be mapped to device address space 170 of device memory 140.

After receiving an indication that host processing logic 110 has stored a host base address at a BAR register, memory management module 172 can determine a plurality of host relative addresses for a plurality of host address regions (of host address space 168) to be mapped to the device address regions (of device address space 170). Each host relative address can represent an offset and/or distance between the host base address (of host address space 168) and the host starting address of each host address region. Memory management module 172 of device processing logic 130 can determine the set of host relative addresses based on, for example, the sizes of the device address regions (which are typically identical to the sizes of the host address regions to be mapped to), as well as the relative locations of the host address regions within the host address space. In a case where all the host address regions are contiguous, memory management module 172 can determine a host relative address of a host address region by accumulating the sizes of other host address regions before the host address region. In some cases, the host relative addresses can also be pre-defined and abide by both management component 169 on the host side and memory management module 172 of peripheral device 120, in which case some of the host address regions can be contiguous while some are not. Memory management module 172 can then map the host relative addresses to the BAR index of the BAR register that stores the host base address in mapping table 414, and map the host relative addresses to the device starting addresses of the device address regions in mapping table 424.

Figure 4B:
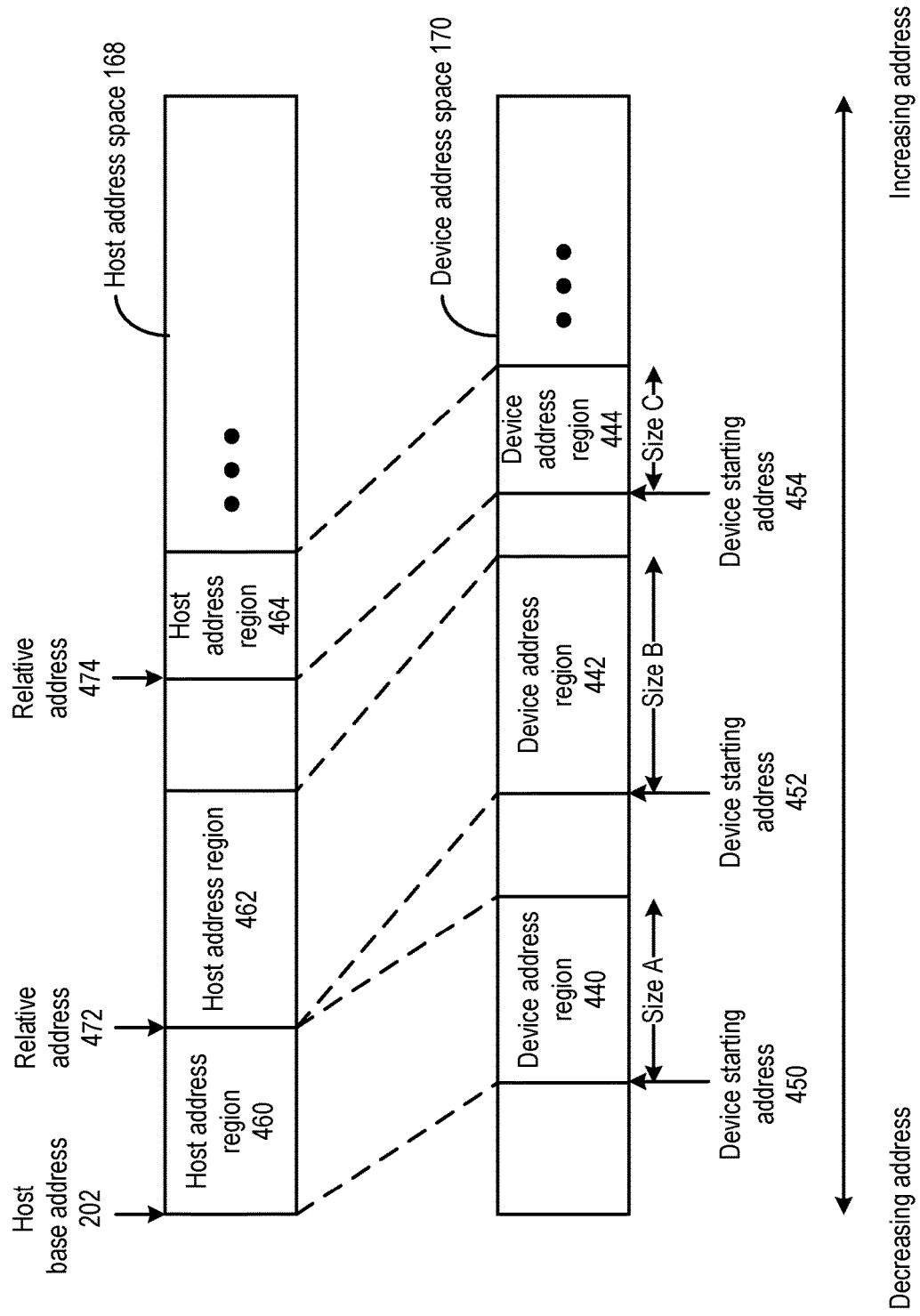

FIG. 4B illustrates an example mapping operations that can be performed by memory management module 172 of device processing logic 130 to determine the host relative addresses. As shown in FIG. 4B, as a result of a memory allocation operation, memory management module 172 can allocate a plurality of device address regions including device address regions 440, 442, and 444. Device address region 440 can be the first device address region within the set and can have a size A and a device starting address 450. Device address region 442 can be the second device address region within the set and have a size B and a device starting address 452 that is larger than device starting address 450. Further, device address region 444 can be the third device address region within the set and have a size C and a device starting address 452.

Based on the order of device starting addresses of device address regions 440, 442, and 444, memory management module 172 can determine that device address region 440 is to be mapped to the first host address region (e.g., host address region 460) of host address space 168, device address region 442 is to be mapped to the second host address region (e.g., host address region 462) of host address space 168, whereas device address region 444 is to be mapped to the third host address region (e.g., host address region 464) of host address space 168.

In addition, memory management module 172 also determines or obtains the host relative addresses for each of host address regions 460, 462, and 464. As described above, the host relative addresses can be pre-defined and abide by both management component 169 on the host side and memory management module 172 of peripheral device 120. In the example of FIG. 4B, the host relative address of host address region 460 can be pre-defined to be zero, whereas the host relative addresses 472 and 474 of, respectively, host address regions 462 and 464 can be pre-defined. In other examples, host address regions can be fully contiguous, and memory management module 172 can determine the host relative addresses of the host address regions by accumulating the sizes of the host address regions. For example, in a case where host address region 462 and host address region 464 are contiguous, memory management module 172 can determine that host relative address 472 of host address region 462 is A (based on the size A of the preceding host base address region 460), whereas host relative address 474 of host address region 464 is A+B (based on the combined sizes of the preceding host base address regions 460 and 462).

Figure 4C:
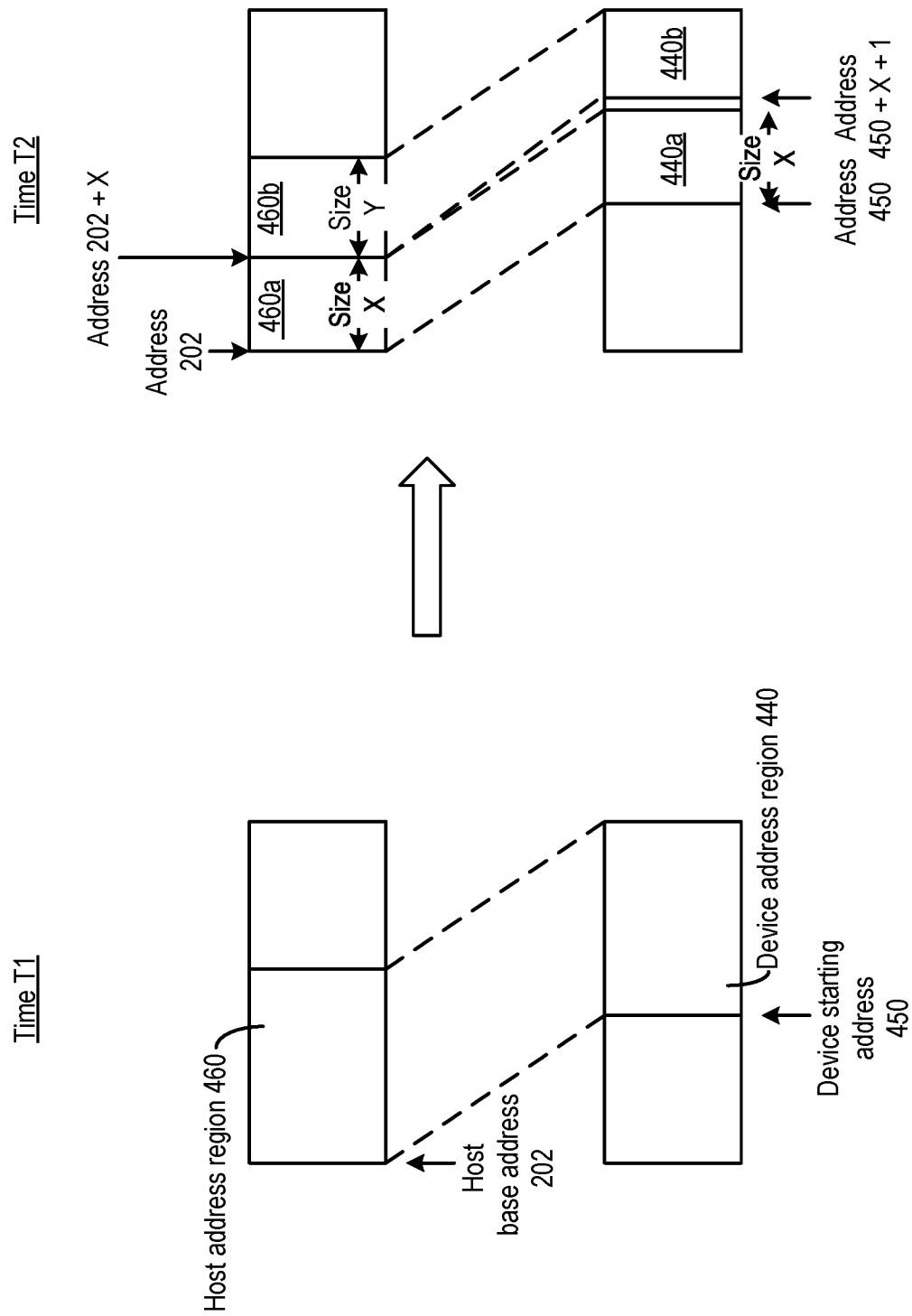

In some examples, memory management module 172 can dynamically update the mapping between the host relative addresses and the device starting addresses in mapping table 424 after the enumeration process. The update to mapping table 424 can be in response to, for example, memory management module 172 detecting that a device address of device memory 140 is inaccessible, and the update can be performed to prevent host processing logic 110 from accessing that device address. FIG. 4C illustrates an example of dynamic update of mapping table 424. At time T1, host address region 460 having a zero host relative address is mapped to device address region 440 having device starting address 450. Memory management module 172 then determines that a device address at device starting address 450+X is faulty. At time T2, memory management module 172 can split host address region 460 into two contiguous host address regions 460a and 460b. Memory management module 172 can also generate device address regions 440a and 440b. Device address region 440a also has a size of X and is mapped to host address region 460a. Device address regions 440a and 440b are separated by the faulty device address, and device address region 440b has a device starting address equal to device starting address 450+X+1 and is mapped to host address region 460b. With such arrangements, when an access request directed to host base address 202+X is received, address translation module 174 can translate the device address as device starting address 450+X+1, instead of device starting address 450+X, to avoid host processing logic 110 accessing the faulty device address.

Figure 5:
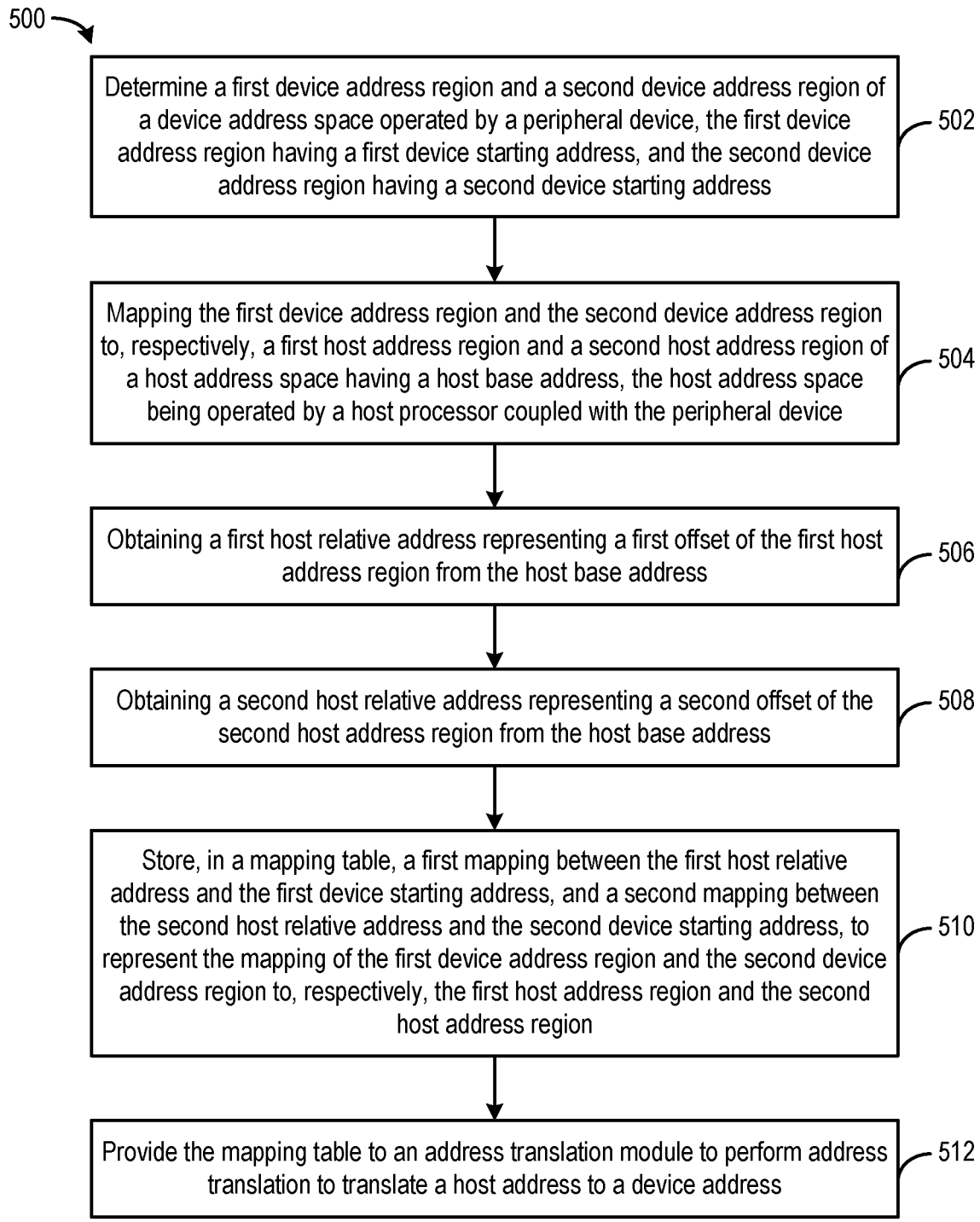
FIG. 5 illustrates an example flow chart demonstrating an example process of mapping between a device address space and a host address space according to certain aspects of the present disclosure.

FIG. 5 illustrates an example flow diagram of a process 500 for mapping between a device address space operated by a peripheral device (e.g., device address space 170) and a host address space operated by a host processor (e.g., host address space 168). Process 500 may be implemented by, for example, memory management module 172.

At operation 502, memory management module 172 determines a first device address region and a second device address region of the device address space. Each of the first device address region and the second device address region can have an address range. The address range of the first device address region starts at a first device starting address, whereas the address range of the second device address region starts at a second device starting address. For example, as shown in FIG. 4B and FIG. 4C, memory management module 172 can determine device address region 440 having device starting address 450 and device address region 442 having device starting address 452.

In some examples, the determination of the device address regions can be part of a memory allocation operation at device memory 140 prior to a PCI-e enumeration process, in which memory management module 172 can allocate the device address regions and store a value indicating a total size of the allocated device address regions at a BAR register. The host processor (e.g., host processing logic 110) can read the total size information from the BAR register, and allocate the host address regions of the same total size to be mapped to device address regions, as described with respect to FIG. 4B. In some examples, the determination of the device address regions can also occur after the enumeration process to prevent the host processor from accessing certain addresses within the device address regions that have been allocated and mapped to the host address regions. For example, as described with respect to FIG. 4C, memory management module 172 can detect that a device address within a device address region is faulty and split the device address region into multiple device address regions excluding the faulty device address. The faulty device address is not to be mapped to any of the host address regions to avoid the host processor accessing the faulty device address.

At operation 504, memory management module 172 maps the first device address region and the second device address region to, respectively, a first host address region and a second host address region of a host address space having a host base address, the host address space being operated by a host processor coupled with the peripheral device.

For example, referring back to FIG. 4B, based on the order of device starting addresses of device address regions 440 and 442, memory management module 172 can determine that device address region 440 is to be mapped to the first host address region (e.g., host address region 460 of host address space 168), and device address region 442 is to be mapped to the second host address region (e.g., host address region 462 of host address space 168). The host address space also has a host base address (e.g., host base address 202).

At operation 506, memory management module 172 obtains a first host relative address representing a first offset of the first host address region from the host base address. At operation 508, memory management module obtains a second host relative address representing a second offset of the second host address region from the host base address. In some examples, the first host address region has a first host starting address and the second host address region has a second host starting address. The first host relative address can represent the first offset of the first host starting address from the host base address, whereas the second host relative address can represent the second offset of the second host starting address from the host base address.

There are various ways by which memory management module 172 obtains the first host relative address and the second host relative address. For example, as described above, the first and second host relative addresses can be pre-defined and abided by both management component 169 on the host side and memory management module 172 of peripheral device 120. As another example, in a case where the host address regions are contiguous, memory management module 172 can also determine the first host relative address and the second host relative address based on accumulating the sizes of the host address regions.

At operation 510, memory management module 172 stores, in a mapping table, a first mapping between the first host relative address and the first device starting address, and a second mapping between the second host relative address and the second device starting address. For example, as shown in FIG. 4A, memory management module 172 can map host relative addresses 428 and 430 to, respectively, device starting addresses 218 and 220 in mapping table 424.

In addition, memory management module 172 can also map a BAR index to the host relative addresses in a second mapping table (e.g., mapping table 414). The mapping can be based on the BAR index being associated with a BAR register that stores a host base address of a host address space, and the host relative addresses being associated with host address regions of that host address space and the host relative addresses being relative to that host base address.

At operation 512, memory management module 172 provides the mapping table to an address translation module to perform address translation to translate a host address to a device address. The address translation can be performed as part of an access operation directed to device memory 140 of peripheral device 120 based on a request received from host processing logic 110.

Figure 6:
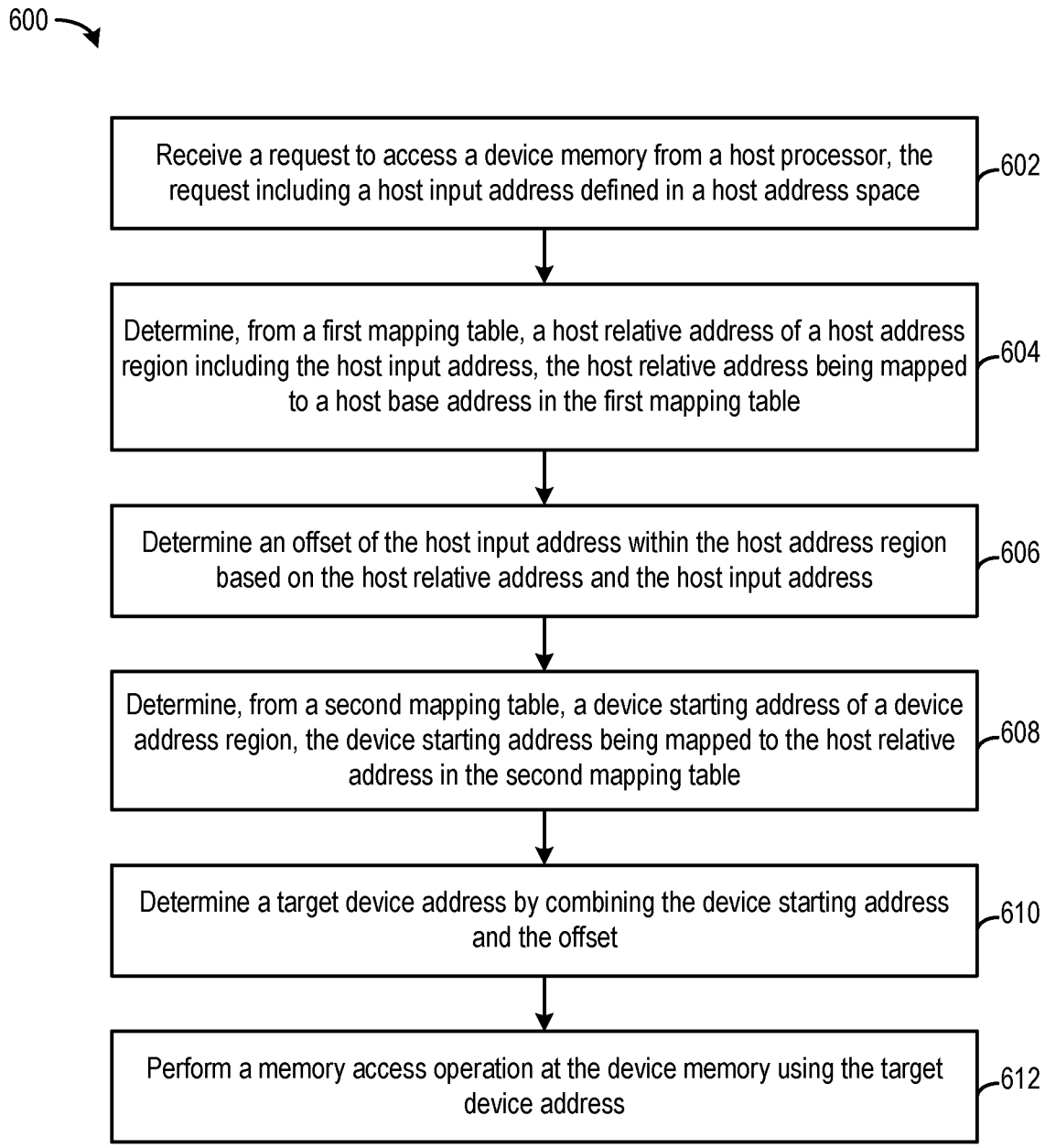
FIG. 6 illustrates an example flow chart demonstrating an example process of performing address translation according to certain aspects of the present disclosure.

FIG. 6 illustrates an example flow diagram of a process 600 for performing memory access of a device memory at a peripheral device (e.g., peripheral device 120) on behalf of a host processor (e.g., host processing logic 110). The memory access can be part of inbound communication from the host processor to the peripheral device to enable the host processor to use resources provided by the peripheral device (e.g., memory resources of device memory 140, hardware resources 150, etc.). The host processor may operate in a host address space (e.g., host address space 168) that starts with a host base address and comprises a plurality of host address regions, with each host address region having a host starting address. The peripheral device may operate in a device address space (e.g., device address space 170) comprising a plurality of device address regions, with each device address region having a device starting address. The peripheral device maintains a first mapping table that maps a plurality of host relative addresses to a BAR register that stores the host base address. Each host relative address can represent the offset of a host starting address of a host address region from the host base address. The peripheral device also maintains a second mapping table that maps the plurality of host relative addresses to a plurality of device starting addresses of the plurality of device address regions. Process 600 may be implemented by various components of peripheral device 120 including, for example, address translation module 174 and memory controller 176.

At operation 602, the peripheral device receives a request to access the device memory from the host processor, the request including a host input address defined in the host address space. The request may be in the form of a packet and received via a bus (e.g., a PCI-e bus) coupled between the host processor and the peripheral device. The request to access the device memory may be part of inbound communication originated from the host processor and directed to the peripheral device. For example, the request can be sent by a driver of a virtual machine hosted on the host processor to transfer image data to a neural network processor on the peripheral device to perform neural network processing as part of an image recognition operation.

At operation 604, the peripheral device determines, from the first mapping table, a host relative address of a host address region including the host input address. More specifically, referring to FIG. 4A, address translation module 174 can first determine the host address range of the host address space from the host base address stored in a BAR register and a BAR size associated with the BAR register, and determine that the host input address is within the host address range. Address translation module 174 can select the BAR index associated with the BAR register, and refer to the first mapping table and retrieve a plurality of host relative addresses mapped to the BAR index. In some examples, address translation module 174 can also add the host base address with each of the plurality of host relative addresses to determine the host starting addresses of the plurality of host address regions represented by the host relative addresses, and determine a first host address region of the host address regions includes the host input address, and select a first host relative address representing the first host address region. In some examples, address translation module 174 can also extract, based on the BAR size, a predetermined number of least significant bits (LSB) from the host input address and compare the extracted LSBs with the host relative addresses to determine the first host address region and the first host relative address.

At operation 606, address translation module 174 determines an offset of the host input address within the host address region based on the host relative address and the host input address. Referring back to FIG. 4A, address translation module 174 can determine the offset (e.g., offset 312) based on a difference between the host input address and the host starting address determined at operation 604, or based on a difference between the extracted LSB and the host relative address determined at operation 604.

At operation 608, address translation module 174 determines, from a second mapping table, a device starting address of a device address region, the device starting address being mapped to the host relative address in the second mapping table. For example, referring back to FIG. 4A, address translation module 174 can refer to mapping table 424 and select device starting address 218 which is mapped to host relative address 428 in mapping table 424.

At operation 610, address translation module 174 determines a target device address by combining the device starting address and the offset. For example, referring back to FIG. 4A, address translation module 174 can combine device starting address 218 with offset 312 to obtain target device address 314.

At operation 612, address translation module 174 can provide the target device address to memory controller 176, which can access device memory 140 using target device address 314. For example, memory controller 176 can perform a write operation to store image data provided by the request (from host processing logic 110) at the target device address. The neural network processor of hardware resources 150 can then access device memory 140 at the target device address to obtain the image data to perform neural network processing.

Figure 7:
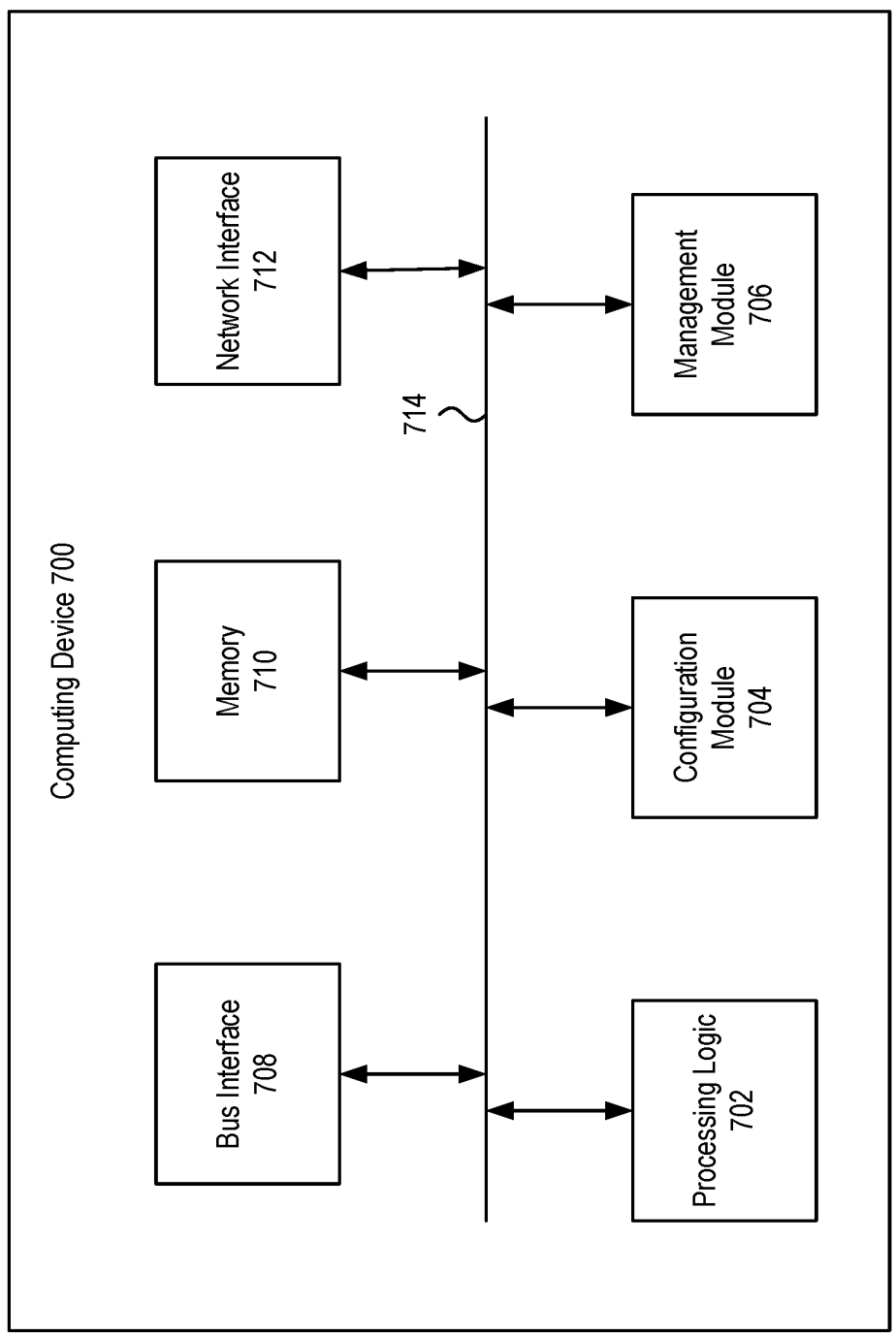
FIG. 7 illustrates an example computing device in which the disclosed techniques can be implemented.

FIG. 7 illustrates an example of a computing device 700. Functionality and/or several components of the computing device 700 may be used without limitation with other embodiments disclosed elsewhere in this disclosure, without limitations. A computing device 700 may perform computations to facilitate processing of a task. As an illustrative example, computing device 700 can be part of a server in a multi-tenant compute service system. Various hardware and software resources of computing device 700 (e.g., the hardware and software resources associated with provision of an image recognition service) can be allocated to a client upon request.

In one example, computing device 700 may include processing logic 702, a configuration module 704, a management module 706, a bus interface module 708, memory 710, and a network interface module 712. These modules may be hardware modules, software modules, or a combination of hardware and software. In certain instances, modules may be interchangeably used with components or engines, without deviating from the scope of the disclosure. The computing device 700 may include additional modules, not illustrated here. In some implementations, the computing device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710 and can store a set of instructions (e.g., firmware) which can be executed by processing logic 702 to perform the methods described herein, including processes 500 and 600. Processing logic 702 may also include hardware circuities including, for example, device processing logic 130, memory controller 176, hardware resources 150, etc.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the computing device 700, while in other cases some or all of the memory may be external to the computing device 700. The memory 710 may store an operating system comprising executable instructions that, when executed by the processing logic 702, provides the execution environment for executing instructions providing networking functionality for the computing device 700. The memory may also store and maintain several data structures and routing tables for facilitating the functionality of the computing device 700. In some examples, memory 710 can include device memory 140.

In some implementations, the configuration module 704 may include one or more configuration registers. Configuration registers may control the operations of the computing device 700. In some implementations, one or more bits in the configuration register can represent certain capabilities of the computing device 700. Configuration registers may be programmed by instructions executing in the processing logic 702, and/or by an external entity, such as a host device, an operating system executing on a host device, and/or a remote device. The configuration module 704 may further include hardware and/or software that control the operations of the computing device 700. For example, configuration module 704 may include configuration registers 300. Configuration module 704 may also include, for example, mapping tables 304 of FIG. 3B, mapping tables 334 and 354 of FIG. 3C, and mapping tables 414 and 424 of FIG. 4A.

In some implementations, the management module 706 may be configured to manage different components of the computing device 700. In some cases, the management module 706 may configure one or more bits in one or more configuration registers at power up, to enable or disable certain capabilities of the computing device 700. In certain implementations, the management module 706 may use processing resources from the processing logic 702. In other implementations, the management module 706 may have processing logic similar to the processing logic 702, but segmented away or implemented on a different power plane than the processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the computing device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 700 may include multiple network interface modules, each configured to communicate with a different network. For example, in these implementations, the computing device 700 may include a network interface module for communicating with a wired Ethernet network, a wireless 802.11 network, a cellular network, an Infiniband network, etc.

The various components and modules of the computing device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 8.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system comprising:
a host processor that operates in a host address space having a host base address, the host address space having host address regions, each of the host address regions having a host starting address;
a peripheral device including a device memory, the peripheral device operating in a device address space comprising device address regions, each of the device address regions having a device starting address; and
a PCI-based bus communicatively coupling the host processor and the peripheral device, wherein the host processor is configured to send a packet including a host input address via the PCI-based bus to the peripheral device,
wherein the peripheral device is configured to:
receive the packet including the host input address via the PCI-based bus;
determine, based on the host input address, a Base Address Register (BAR) index;
determine a first host relative address based on the BAR index, the first host relative address representing an offset of a first host starting address of a first host address region with respect to the host base address;
determine a first device starting address of a first device address region using a first mapping table that maps host relative addresses, including the first host relative address, to device starting addresses of the device address regions, and based on the first host relative address;
determine a target device address based on the first device starting address; and
perform a memory access operation at the device memory at the target device address to process the packet.

2. The system of claim 1, wherein the host address regions comprise the first host address region and a second host address region;
wherein the device address regions comprise the first device address region and a second device address region;
wherein the first host address region and the second host address region are contiguous; and
wherein the first device address region and the second device address region are not contiguous.

3. The system of claim 2, wherein the BAR index is associated with a Base Address Register (BAR) that stores the host base address;
wherein the host processor is configured to store the host base address at the BAR; and
wherein the peripheral device is configured to execute software to map the BAR index to the host relative addresses in a second mapping table based on receiving an indication that the host processor stores the host base address at the BAR, and to determine the first host relative address from the second mapping table.

4. An apparatus comprising:
a hardware processor;
a memory;
a bus interface;
wherein the hardware processor is configured to:
receive, from a host device and via the bus interface, a packet including a host input address, the host input address being defined based on a first host address space operated by the host device;
determine, based on the host input address, an index associated with a configuration register;
determine, based on the index, a first host relative address, the first host relative address representing an offset relative to a first host base address of the first host address space;
determine, from a mapping between host relative addresses and device addresses, and based on the first host relative address, a target device address of the memory; and
access the memory at the target device address on behalf of the host device.

5. The apparatus of claim 4, further configured to store a plurality of host base addresses of a plurality of host address spaces including the first host address space, each of the plurality of host address spaces comprising host address regions having pre-determined sizes; and
wherein the hardware processor is configured to select, from the host base addresses, the first host base address for the host input address based on a relationship between the host input address and the first host base address and the sizes of the host address regions of the first host address space.

6. The apparatus of claim 5, wherein the bus interface is PCI-based;
wherein the apparatus is a PCI-compatible peripheral device and comprises Base Address Registers (BAR), each of the BAR configured to store a host base address of the host base addresses and associated with a BAR index; and
wherein the configuration register is a first BAR associated with a first BAR index.

7. The apparatus of claim 6, wherein the hardware processor is configured to:
store a first mapping table that maps each of the BAR indices to a host relative address;
store a second mapping table that maps device starting addresses of device address regions to the host relative addresses;
determine, based on the host input address, the first BAR index associated with the first BAR that stores the host base address;
determine, from the first mapping table and based on the first BAR index, the host relative address; and
determine, from the second mapping table and based on the host relative address, a device staring address; and
wherein the target device address is determined based on the device starting address.

8. The apparatus of claim 7, wherein the first BAR index is mapped to a first host relative address of a first host address region and a second host relative address of a second host address region, the first host address region and the second host address region being part of the first host address space;

wherein the BARs are associated with BAR sizes, each of the BAR sizes indicating a size of a host address space of which the respective host base address is stored in the respective BAR; and wherein the hardware processor is configured to:
determine a first BAR size associated with the first BAR;
extract a pre-determined number of least significant bits (LSBs) from the host input address, the number of LSBs extracted being determined based on the first BAR size;
compare the extracted LSBs with each of the first host relative address and the second host relative address;
select the first host relative address based on a result of the comparison; and
determine the device starting address from the second mapping table based on the first host relative address.

9. The apparatus of claim 8, wherein the target device address is determined based on adding an offset between the extracted LSBs and the first host relative address to the device starting address.

10. The apparatus of claim 8, wherein the first host address region and the second host address region are contiguous; and
wherein the device address regions are not contiguous.

11. The apparatus of claim 10, wherein the hardware processor is further configured to determine the second host relative address based on a size of the first host address region.

12. The apparatus of claim 8, wherein the hardware processor is further configured to: obtain the first host relative address and the second host relative address from a set of pre-defined host relative addresses agreed upon between the apparatus and the host device.

13. The apparatus of claim 7, wherein the host device is configured to determine the host base address; and
wherein the hardware processor is configured to determine the first mapping table and the second mapping table.

14. The apparatus of claim 7, wherein the first mapping table and the second mapping table are stored in a non-secure memory of the apparatus.

15. The apparatus of claim 8, wherein the hardware processor is further configured to:
determine the device address regions as part of a memory allocation operation at the memory;
determine a total size of the device address regions; and
store the total size at the first BAR; and
wherein the host device is configured to:
determine a total size of the first host address space based on the total size of the device address regions received from the first BAR;
allocate the first host address space;
determine the host base address of the first host address space; and
store the host base address at the first BAR; and
wherein the hardware processor is configured to, responsive to detecting that the host base address is stored at the first BAR:
map the first host relative address and the second host relative address to a first BAR index of the first BAR in the first mapping table; and
map a first device starting address and a second device starting address to, respectively, the first host relative address and the second host relative address in the second mapping table.

16. The apparatus of claim 15, wherein the hardware processor is further configured to:
determine that a first device address included in a first device address region of the device address regions is faulty, the first device address region being mapped to a first host address region having a first host relative address;
split the first device address region into a second device address region and a third device address region to exclude the first device address, the second device address region having a first device starting address and the third device address region having a third device starting address;
split the first device address region into two contiguous host address regions having the first host relative address and a second host relative address; and
update the second mapping table to map the first host relative address to the first device starting address and to map the second host relative address to the second device starting address.

17. The apparatus of claim 4, further comprising hardware resources; and
wherein the hardware processor is configured to:
extract data from the packet;
perform a write operation to the memory to store the data at the target device address; and
transmit an indication of the write operation to the hardware resources, to enable the hardware resources to obtain the data from the memory.

18. The apparatus of claim 17, wherein the host device hosts an image recognition application;
wherein the hardware resources comprises a neural network processor configured to perform neural network computations to support the image recognition application; and
wherein the data include image data.

19. A method comprising:
determining a first device address region and a second device address region of a device address space operated by a peripheral device, the first device address region having a first device starting address, and the second device address region having a second device starting address;
mapping the first device address region and the second device address region to, respectively, a first host address region and a second host address region of a host address space having a host base address, the host address space being operated by a host processor coupled with the peripheral device;
obtaining a first host relative address representing a first offset of the first host address region from the host base address;
obtaining a second host relative address representing a second offset of the second host address region from the host base address
storing, in a first mapping table, a first mapping between the first host relative address and the first device starting address, and a second mapping between the second host relative address and the second device starting address;
storing, in a second mapping table, a second mapping between an index of a configuration register, the first host relative address, and the second host relative address;

providing the first mapping table and the second mapping table to an address translation module to perform address translation to translate a host address to a device address.

20. A method, comprising:

receiving a request to access a device memory from a host processor, the request including a host input address defined in a host address space;

determining, from a first mapping table, a host relative address of a host address region including the host input address, the host relative address being mapped to, in the first mapping table, an index of a configuration register that stores a host base address, the host relative address representing a first offset from the host base address;

determining a second offset of the host input address within the host address region based on the host relative address and the host input address;

determining, from a second mapping table, a device starting address of a device address region, the device starting address being mapped to the host relative address in the second mapping table;

determining a target device address by combining the device starting address and the second offset; and performing a memory access operation at the device memory using the target device address.

21. The system of claim 1, wherein the BAR index is mapped to multiple host relative addresses; and wherein the first host relative address is selected from the multiple host relative addresses.

22. The apparatus of claim 4, wherein the index is mapped to multiple host relative addresses; and wherein the first host relative address is selected from the multiple host relative addresses.

23. The method of claim 19, wherein the configuration register is a PCI Base Address Register (BAR); and wherein the index is a BAR index associated with the BAR register.

24. The method of claim 20, wherein the configuration register is a PCI Base Address Register (BAR); and wherein the index is a BAR index associated with the BAR register.

* * * * *